Patented July 19, 1949

2,476,655

UNITED STATES PATENT OFFICE 2,476,655

DERIVATIVES OF SULFONIC ACID AMIDES AND A METHOD OF PREPARING THE SAME

Hermann Fox, Berlin-Frohnau, Paul Diedrich, Finkenkrug (Osthavelland), near Berlin, and Max Dohrn, Berlin-Charlottenburg, Germany, assignors to Schering Corporation, Bloomfield, N. J., a corporation of New Jersey No Drawing. Application June 24, 1941, Serial No. 399,528. In Germany January 22, 1941

15 Claims. (Cl. 260—239.6)

This invention relates to sulfone amides and especially to a process of making derivatives of said compounds.

It is already known that sulfone amides of the general formula $R.SO_2.NYX$, wherein R represents an aromatic, heterocyclic or aromatic-heterocyclic residue with an amino group, situated in p-position to the sulfone amide group, or a group convertible thereinto, while X stands for hydrogen or an acyl-, hydrocarbon- or heterocyclic residue, especially a pyridyl-, thiazol-, thiodiazol-, pyrimidine- or a $-R.SO_2.NY-$ or an $SO_2.R$-residue and Y for hydrogen or a hydrocarbon residue, especially an alkyl residue, possess strongly bactericidal activity. Until today these sulfone amides have been obtained either by introducing X into the $R.SO_2.NY$-residue or by condensing the group $-NYX$ with the $R.SO_2$-residue (compare, for instance, U. S. Ser. No. 253,734, now Patent No. 2,411,495, Hungarian Letters Patent 123,788; U. S. Ser. Nos. 334,580, now Patent No. 2,341,086, 339,484, now abandoned; U. S. Ser. No. 369,256, now abandoned; British Letters Patents 512,145 and 517,272; German Letters Patents 679,280 and 686,903; British Letters Patent 482,576 and others, and, for instance, Helvetica Chimica Acta, volume XXII, page 912).

Now it has been found that it is not necessary to use compounds as starting materials for producing said products, which already contain an $SO_2$-group, but that one may also start with the corresponding sulfenic-or sulfinic acid amides, which, according to this invention, are converted by oxidation into the corresponding sulfonic acid amides.

For the manufacture of these amides, especially of the sulfenic acid amides, which themselves possess bactericidal properties and which are employed as starting materials for making the corresponding sulfonic acid amides, methods known per se may be used, that is in principle the following methods:

1. Those, wherein the residue $R.S.NY-$ or $R.SO.NY-$ is already preformed and the residue $-X$ is introduced, or 2. Those, wherein the residue $RS-$ or $RSO-$ is already preformed and the residue $-NYX$ is introduced.

To the first mentioned group belong the manufacturing processes consisting in condensing compounds of the formula $R.S.NY.H$ or $R.SO.NY.H$ or their metal compounds with compounds of the formula $Hal.X$ wherein R, X and Y have the above described meaning, while Hal stands for halogen, that is to say, for instance, the condensation of p-nitro-, p-acetylamino-, p-propionyl amino-, p-benzylamino-phenyl-sulfenic acid amide and others with acetyl-, propionyl-, butyryl-, crotonyl-, isovaleryl-, capronyl-dodecanoyl-, benzoyl-, nicotoylchloride, 2-chloropyridine, 2-chlorothiodiazol, 2-chloro-5-ethylthiodiazol, 2 - chlorothiazol, 2 - chloro-5-methyl-thiazol, 2-chloro pyrimidine and others. Instead of acid halogenides one may also use their anhydrides (compare U. S. Ser. Nos. 253,734, 334,580, 339,484; Hungarian Letters Patent 123,788).

In this condensation process agents capable of splitting off and/or combining with halogen hydride may also be present.

Thereby it is advisable to use as substituent, being situated in p-position and convertible into an amino group, such a one, as is not at all or only inconsiderably attacked by the oxidation agents employed, that is, for instance, a nitro-, acylamino-, halogen- or the like group, in order to avoid by-reactions. The conversion of these groups into the amino group can be carried out as well before as after the oxidation of the sulfenic- or sulfinic acid amides into the corresponding sulfonic acid amides.

For the above described condensation processes also compounds of the formula $R.S.NY.Hal$ or $R.SO.NY.Hal$ on the one hand and compounds of the formula $H.X$ on the other hand may be used as starting materials, whereby the condensation is suitably carried out in the presence of agents capable of splitting off and/or combining with halogen hydride, in order to obtain the above described compounds.

To the second group of processes mentioned above there belong, for instance, the condensation of compounds of the formulae $R.S.Hal$ or $R.SO.Hal$ with compounds of the formula $H.Y.NX$ as, for instance, the condensation of p-nitrophenyl sulfenic acid chloride or p-nitrophenylsulfinic acid chloride, nitropyridyl sulfenic acid chloride with aniline, acetamide, benzamide, α-aminopyridine, 2-amino-thiazol, 2 - amino - 1 - thio - 3,4 - diazol, p-acetylaminobenzolsulfonic acid amide and others. Furthermore, the condensation of compounds of the formula $R.S.Me$, wherein Me represents a metal, especially an alkali metal or silver, with compounds of the formula $Hal.NYX$, that is to say, for instance, the condensation of p-nitrophenyl-sodium-mercaptide and N-chloroacetamide, N-chloroamino-pyridine, N-chloroamino-thiodiazol (compare, for instance, German Letters Patent 586,351). The condensation of compounds of the formula R.S.H or their salts or of the corresponding disulfides R.S.S.R with compounds of the formula H.Y.N.X in the presence of oxidation agents, as for instance, sodium hypochlorite and others, to the sulfenic acid amides of the formula R.S.NYX (compare, for instance, German Letters Patent 615,580) also belongs to the same group.

The conversion of the sulfenic- or sulfinic acid amides into the corresponding sulfonic acid amides is carried out in a known manner by treating said amides with oxidation agents, as they are, for instance, described in Houben, "Die Methoden der organischen Chemie," 3rd edition, volume III, page 1278 ff., especially by treatment with potassium permanganate, hydrogen peroxide, sodium peroxide and others.

The conversion of the group, convertible into an amino group, into this amino group is carried out according to methods known per se; thus, for instance, an acylamino group is transformed by hydrolysis into the amino group, a benzylamino group by reduction or hydrolysis, a nitro group by reduction, and so on.

The reduction of the nitro compounds can be carried out in a manner known per se, whereby, however, those methods, which are to be carried out with weakly acid or neutral reaction, are the preferred ones. Thus, catalytic reduction in the presence of a so-called Raney-nickel catalyst, reduction with iron-II-salts, especially iron-II-salt in formic acid and especially reduction with titanium trichloride in alcohol are preferably employed. In this manner the reduction of the p-nitrophenyl- or 5-nitro-pyridine sulfenic acid amides is carried out with good yield and without splitting off the -S-NY-group.

The following examples serve to illustrate the invention, without, however, limiting the same to them:

*Example 1*

3.78 grs. of p-nitrophenyl sulfenic acid chloride (melting point 52° C.; obtained by passing chlorine into a carbon tetrachloride solution of p-nitrothiophenol) and having the formula

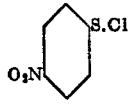

are intimately mixed with 1.18 grs. of acetamide and heated on the water-bath with 20 ccs. of pyridine. Thereafter the solution is poured into ice-cooled 2 n hydrochloric acid, the precipitate is filtered off, washed with water, whereafter the precipitate is then recrystallized from benzene. The p-nitrophenyl sulfenic acid-acetylamide thus obtained forms faintly yellowish leaflets of melting point 159–160° C.

1.0 g. of p-nitrophenyl-sulfenic acid acetylamide is oxidized in about 50% acetic acid solution with a 3% potassium permanganate solution at water-bath temperature. On cooling the p-nitrophenyl sulfonic acid (acetyl-) amide crystallizes in colourless needles of melting point 193° C.

10 grs. of p-nitrophenyl-sulfonic acid acetylamide are dissolved in 50 ccs. of methanol and reduced with hydrogen in the presence of Raney-nickel catalyst. Thereby p-aminobenzene sulfonic acid acetylamide of melting point 181° C. is obtained.

The manufacture of the p-aminobenzene sulfonic acid acetamide can also be carried out in the following manner:

Into 50 ccs. of water-free ether dry ammonia is introduced until the solution is saturated, while simultaneously there is added gradually an ethereal solution of 5 grs. of p-nitro phenyl sulfenic acid chloride. Thereupon the solution is allowed to stand for a short time, and carefully shaken with water. The ethereal solution separated thereby is dried and the ether distilled off. From benzene-benzine there is obtained p-nitrophenylsulfenic acid amide of melting point 103° C.

1 gr. of p-nitrophenylsulfenic acid amide is shaken for two hours in moist ether with an aqueous, weakly alkaline 5% potassium permanganate solution. Thereafter the ether is evaporated, the residue carefully extracted with water, again precipitated, dried with sodium sulfate and then distilled off. From the residue p-nitrobenzene sulfonic acid amide of melting point 177° C. (from alcohol) is obtained.

1 gr. of the acetyl derivative, obtained upon acetylation from p-nitrobenzol sulfonic acid amide is reduced in alcohol by means of hydrogen in the presence of the so-called Raney-nickel catalyst. On concentration of the solution, filtered from the catalyst, p-aminobenzol sulfonic acid acetylamide of melting point 189° C. is obtained.

It is also possible to carry out the reduction of the nitro group to the amino group before the oxidation, for instance, as follows:

1 gr. of p-nitrophenyl sulfenic acid acetyl amide, dissolved in 20 cc. of alcohol, is mixed with 20 ccs. of a 15% titanium chloride solution. Under decolorisation of the titanium chloride solution reduction takes place, whereby at the same time precipitation is observed. The precipitate is filtered off by suction and acetylated with acetic acid anhydride. p-acetyl amino phenyl sulfenic acid amide of melting point 215° C. forming colorless needles is obtained.

*Example 2*

28 grs. of p-nitro phenyl sulfenic acid chloride in ethereal solution are added to an ethereal solution of 30 grs. of α-amino pyridine. An oily precipitate slowly becoming solid, separates. After recrystallisation from benzene, faintly yellow needles of melting point 175° C. are obtained.

1.0 gr. of the p-nitro phenyl sulfenic acid amino pyridide thus obtained are dissolved in some acetic acid and oxidized on the water bath with 30% hydrogen peroxide solution. On concentration of the solution, freed from excess hydrogen peroxide on continuous heating, p-nitro phenyl sulfonic acid amino pyridide in colorless crystals of melting point 172° C. is obtained.

On oxidation with 30% potassium permanganate solution in 50% acetic acid the same compound may also be obtained.

Instead of the nitro compound the p-acetyl amino phenyl sulfenic acid amino pyridide may also be used for the oxidation. This compound is obtained, when 3.4 grs. of p-nitro phenyl sulfenic acid amino pyridide, dissolved in alcohol, are reduced with hydrogen in the presence of Raney-nickel catalyst. Thereby 1300 ccs. of hydrogen are absorbed (calculated amount: 1240 ccs.).

On concentration of the solution, filtered off from the catalyst, an oil is obtained, which is converted with acetic acid anhydride into the corresponding acetyl compound. It forms colorless crystals from alcohol. Melting point 216° C.

Example 3

1.89 grs. of p-nitro phenyl sulfenic acid chloride are dissolved in ether and added to a solution of 2.0 grs. of amino thiazol in ether. On washing the ethereal solution with water p-nitro phenyl sulfenic acid amido thiazol gradually precipitates in the form of a fine crystal powder between the ether and the water layer, said compound forming yellow needles of melting point 165° C. from benzene.

The oxidation to the corresponding sulfonic acid compound is carried out in an analogous manner to that described in Example 1.

1 gr. of the p-nitro phenyl sulfonic acid amido thiazol obtained is dissolved in 20 ccs. of formic acid. Thereto are added at 50° C. 5 gr. of iron turnings, which are previously corroded with 5 ccs. of concentrated hydrochloric acid. After heating for 30 minutes, the solution is filtered off from the undissolved iron and the filtrate is poured into twenty-fold its volume of ice water. After allowing the solution to stand for about 12 hours, p-amino phenyl sulfonic acid amido thiazol separates from this solution as a fine precipitate, which, on being recrystallized from alcohol, has the melting point of 196-197° C.

Example 4

1.89 grs. of nitro phenyl sulfenic acid chloride are dissolved in cold glacial acetic acid and added to a solution of 2 grs. of 2-amino thiodiazol in some glacial acetic acid. The solution is heated on the water bath for 15 minutes and thereafter diluted with ether. Thus, p-nitro phenyl sulfenic acid-2-amido thiodiazol crystallizes. Faintly yellowish needles from benzene of melting point 155-158° C.

3 grs. of the p-nitro phenyl sulfonic acid amido thiodiazol, obtained therefrom by oxidation with potassium permanganate or hydrogen peroxide in glacial acetic acid, are reduced with stannous chloride in hydrochloric acid. After removing the tin with hydrogen sulfide, a solution of the chlorohydrate of p-amino phenyl sulfonic acid amido thiodiazol is produced, which may be converted by careful reaction with alkali carbonate into beautiful colorless crystals of the free base.

Example 5

1.89 grs. of p-nitro phenyl sulfenic acid chloride and 1.15 grs. of 2-amino-5-methyl-1,3,4-thiodiazol are intimately mixed and then heated with pyridine on the water bath. Thereupon the solution is poured into ice-cooled 2 n hydrochloric acid. The greenish colored precipitate is washed with water and recrystallized twice from alcohol. Thus, p-nitro phenyl sulfenic acid amido-2-methyl-5-thiodiazol is obtained in yellow needles of melting point 169-170° C.

The oxidation of p-nitro phenyl sulfenic acid amido-2-methyl-5-thiodiazol can be carried out with potassium permanganate. p-nitro phenyl sulfonic acid amido-2-methyl-5-thiodiazol is produced in good yield.

The oxidation of said sulfenic acid amide to the corresponding sulfonic acid amide and the subsequent reduction of the nitro group to the amino group are carried out in the same manner as in Example 1. The p-amino phenyl sulfonic acid amido-2-methyl-5-thiodiazol melts at 202° C.

2 grs. of iron turnings are stirred for at least one hour with 0.8 gr. of iron-3-chloride in 10 ccs. of water at 70° C. Then 1 gr. of p-nitro phenyl sulfonic acid amido-2-methyl-5-thiodiazol in 10 ccs. of formic acid is added thereto and the solution is heated up to 80° C., while stirring. After two hours insoluble matter is filtered off by suction from the solution and the clear filtrate is poured into much ice water. p-amino phenyl sulfonic acid amido-2-methyl-5-thiodiazol is obtained as a fine precipitate. Fine crystals of melting point 202° C. (from alcohol).

Example 6

1.89 grs. of nitro phenyl sulfenic acid chloride are intimately mixed with 2.14 grs. of p-acetyl amino phenyl sulfonic acid amide, poured over with pyridine and then shaken. Thereafter the solution is heated for a short time on the water bath and poured into ice-cooled 2 n hydrochloric acid. The precipitate is washed with water and recrystallized from glacial acetic acid. Melting point 217° C.; colorless needles. The p-nitro phenyl sulfenic acid (p'-acetyl amino phenyl sulfonic acid) imide is analogously oxidized according to Example 1 by means of potassium permanganate to the corresponding disulfonic acid imide compound, the nitro group of which is reduced and, if necessary, the acetylamino group is converted into the amino group by hydrolysis.

Instead of acylated amino phenyl sulfonic acid amides, acylated p-amino phenyl sulfenic or sulfinic acid amides can also be used; on oxidation the condensation products, obtained thereby, are also transformed into the corresponding disulfonic acid imides.

Example 7

1.8 grs. of nitro phenyl sulfenic acid chloride are reacted according to Example 6 with 2.0 grs. of p-amino phenyl sulfonic acid dimethylamide. The p-nitro phenyl sulfenic acid (p'-sulfonic acid dimethyl amido) anilide obtained is oxidized according to example 1 to the corresponding disulfonic acid imide compound, whereupon the nitro group is reduced to the amino group.

Example 8

15.8 grs. of 2-chloro-5-nitro pyridine are poured over with 50 ccs. of alcohol so as to form a layer thereupon and then mixed with a solution of 24 grs. of crystallized sodium sulfide in 25 ccs. of water. Vigorous reaction takes place. After boiling for 5 minutes, the solution is diluted with much cold water, whereby a small precipitate is formed. The solution is filtered off and the mercaptan is then precipitated from the clear filtrate by means of sulfur dioxide. The 5-nitro-2-mercapto pyridine crystallizes from a benzene-alcohol-mixture (10+1) in yellowish-red needles of melting point 176° C.

Into a suspension of 15.0 grs. of dry 5-nitro-2-mercapto pyridine in carbon tetrachloride chlorine gas is introduced for at least 3 hours while stirring vigorously. The chlorine in excess is expelled by passing nitrogen through the solution whereafter the latter is concentrated in vacuo. The 5-nitro pyridine sulfenic acid chloride is obtained in yellow crystals of melting point 116-118° C. which fume in open air. This chloride may be converted in the same manner as the p-nitro phenyl sulfenic acid chloride into the corresponding 5-nitro pyridine-2-sulfenic acid amide, from which upon oxidation 5-nitro pyridyl-2-sulfonic acid amide is produced, whereafter the nitro group of the same is reduced to the amino group.

In the same manner as described in the above examples the following compounds can be produced:

5-amino pyridyl-2-sulfonic acid acetamide
5-amino pyridyl-2-sulfonic acid amido phenyl sulfonic acid dimethyl amide
5-amino pyridyl-2-sulfonic acid amino pyridine
5-amino pyridyl-2-sulfonic acid amido thiazol
5-amino pyridyl-2-sulfonic acid amino thiodiazol
5-amino pyridyl-2-sulfonic acid amino methyl thiodiazol
p-Amino phenyl sulfonic acid-2-amido-5-ethyl-1,3,4-thiodiazol
p-Amino phenyl sulfonic acid-2-amido-5-propyl-1,3,4-thiodiazol
p-Amino phenyl sulfonic acid-2-amido-5-isopropyl-1,3,4-thiodiazol, and their higher -5-alkyl homologues
p-Amino phenyl sulfonic acid-2-amido pyrimidine, and others Of course, many changes and variations in the reaction conditions, the starting materials used, the solvents and catalysts employed, and the like may be employed by those skilled in the art in accordance with the principles set forth herein and in the claims annexed hereto.

What we claim is:

1. Process for the manufacture of sulfone amides of the general formula R.SO₂.NHX wherein R represents a phenyl radical to which the group —SO₂.NHX is attached, said radical having in the p-position a group containing a nitrogen atom directly bound to such radical, the latter being otherwise unsubstituted, X being a member of the class consisting of unsaturated heterocyclic radicals containing two nitrogen atoms in the ring and acyl radicals of carboxylic acids, comprising reacting the corresponding amide in which the sulfur has one of its valences which is lower than 6, with an oxidizing agent to convert the sulfur group into an —SO₂— group.

2. Process according to claim 1 wherein X is a pyrimidine radical.

3. Process according to claim 1, wherein X is an acyl group of a lower aliphatic carboxylic acid.

4. Process according to claim 1, wherein X is an acetyl radical.

5. In a process for the manufacture of p-substituted benzene sulfonamides, the steps which comprise reacting a compound of the formula RS(O)ₙNH₂ wherein R is a benzene radical having in the p-position a group containing a nitrogen atom directly bound to such radical, and n is one of the numbers 0 and 1, with the anhydride of a carboxylic acid, and thereafter oxidizing the product to the corresponding —SO₂— compound.

6. In a process for the manufacture of p-substituted benzene sulfonamides, the steps which comprise p-nitro phenyl sulfenic amide with acetyl chloride, and oxidizing the resulting compound to the corresponding —SO₂— compound.

7. In a process for the manufacture of p-substituted benzene sulfonamides, the steps which comprise reacting p-nitro-phenyl sulfenic acid chloride with acetamide, and thereafter oxidizing the product to the corresponding —SO₂— compound.

8. In a process for the manufacture of p-substituted benzene sulfonamides, the steps which comprise reacting p-nitro phenyl sulfenic acid chloride with an amino pyrimidine and thereafter oxidizing the product to the corresponding —SO₂— compound.

9. A phenyl sulfenic acid amide substituted in the amide group by a cyclic radical containing two nitrogen atoms in the ring, the amide containing in the p-position of the phenyl radical a group having a nitrogen atom directly bound to the phenyl radical, the phenyl group being otherwise unsubstituted.

10. A phenyl sulfenic acid -2-amido-pyrimidine containing in the p-position of the phenyl radical a group having a nitrogen atom directly bound to the phenyl radical, the phenyl group being otherwise unsubstituted.

11. A compound of the group consisting of (p-nitrobenzene sulphenamido) diazines.

12. A compound of the group consisting of 2(p-nitrobenzene sulphenamido) pyrimidines.

13. P-amino phenyl sulfenic acid-2-amido-pyrimidine having the structural formula

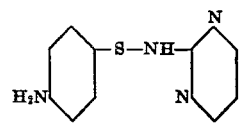

14. A phenyl sulfenic acid amide substituted in the amide group by the acyl radical of a carboxylic acid, and having in the p-position a radical having a nitrogen atom directly bound to the phenyl radical.

15. p-nitrophenyl-sulfenic acid acetylamide, having a melting point of about 159–160° C.

HERMANN FOX.
PAUL DIEDRICH.
MAX DOHRN.

REFERENCES CITED

The following references are of record in the file of this patent:

UNITED STATES PATENTS

| Number | Name | Date |
|---|---|---|
| Re. 19,286 | Zaucker et al. | Aug. 21, 1934 |
| 2,045,888 | Tschunkur | June 30, 1936 |
| 2,216,515 | Johnson | Oct. 1, 1940 |
| 2,259,222 | Ewins | Oct. 14, 1941 |
| 2,316,825 | Vonkennel et al. | Apr. 20, 1943 |

FOREIGN PATENTS

| Number | Country | Date |
|---|---|---|
| 509,804 | Great Britain | July 21, 1939 |
| 843,073 | France | Mar. 20, 1939 |

OTHER REFERENCES

Chemical Abstracts, vol. 24, pp. 365–366.
Chemical Abstracts, vol. 24, page 601.
Chemical Abstracts, vol. 25, page 289.
Chemical Abstracts, vol. 26, pp. 114–115.
Chemical Abstracts, vol. 21, page 1971.